(12) United States Patent
Kranz et al.

(10) Patent No.: US 8,679,614 B2
(45) Date of Patent: Mar. 25, 2014

(54) POLYMERIC FIBERS COATED WITH AN OLEFIN BLOCK COPOLYMER CONTAINING RESIN AND LAMINATES COMPRISING POLYMERIC FIBERS IN A RESIN OF OLEFIN BLOCK COPOLYMERS

(75) Inventors: Bart Clemens Kranz, Volkel (NL); Jan Adolph Dam Backer, Nijnsel (NL); Benjamin Slager, Rhenen (NL)

(73) Assignee: Novameer B.V., Veghel (NL)

( * ) Notice: Subject to any disclaimer, the term of this patent is extended or adjusted under 35 U.S.C. 154(b) by 435 days.

(21) Appl. No.: 12/990,831

(22) PCT Filed: May 5, 2009

(86) PCT No.: PCT/EP2009/055395
§ 371 (c)(1),
(2), (4) Date: Apr. 11, 2011

(87) PCT Pub. No.: WO2009/135828
PCT Pub. Date: Nov. 12, 2009

(65) Prior Publication Data
US 2011/0183103 A1  Jul. 28, 2011

(30) Foreign Application Priority Data
May 5, 2008 (EP) .................................... 08155660

(51) Int. Cl.
*B32B 5/12* (2006.01)
*B32B 5/26* (2006.01)
*B32B 5/28* (2006.01)

(52) U.S. Cl.
USPC ...... 428/107; 156/276; 264/173.11; 428/114; 428/156; 428/213; 428/364

(58) Field of Classification Search
USPC ........................... 428/107, 114, 156, 213, 364
See application file for complete search history.

(56) References Cited

U.S. PATENT DOCUMENTS

| | | | |
|---|---|---|---|
| 5,578,370 A | 11/1996 | Ferrar et al. | |
| 2006/0199931 A1* | 9/2006 | Poon et al. | 526/346 |
| 2007/0202330 A1 | 8/2007 | Peng et al. | |

FOREIGN PATENT DOCUMENTS

| | | |
|---|---|---|
| EP | 1 403 038 A1 | 3/2004 |
| WO | WO 03/008190 A1 | 1/2003 |
| WO | WO 2005/090425 A1 | 9/2005 |
| WO | WO 2006/101927 A2 | 9/2006 |
| WO | WO 2006/107197 A1 | 10/2006 |
| WO | WO 2008/040506 A1 | 4/2008 |
| WO | WO 2008/040509 A1 | 4/2008 |
| WO | WO 2008/040510 A1 | 4/2008 |
| WO | WO 2008/040511 A1 | 4/2008 |

OTHER PUBLICATIONS

International Search Report issued in International Patent Application No. PCT/EP2009/055395, mailed Jul. 27, 2009.
Written Opinion of the International Searching Authority issued in International Application No. PCT/EP2009/055395, mailed Jul. 27, 2009.

* cited by examiner

*Primary Examiner* — Brent O'Hern
(74) *Attorney, Agent, or Firm* — Oliff PLC

(57) ABSTRACT

Polymeric fibers coated with an olefin block copolymer containing resin, the olefin block copolymer having a density of 0.815 kg/dm$^3$ to 0.920 kg/dm$^3$ and a melting point of 110° C. to 130° C. and laminates comprising polymeric tapes embedded in a resin of olefin block copolymer having a density of 0.815 kg/dm$^3$ to 0.920 kg/dm$^3$ and a melting point of 110° C. to 130° C.

24 Claims, No Drawings

POLYMERIC FIBERS COATED WITH AN OLEFIN BLOCK COPOLYMER CONTAINING RESIN AND LAMINATES COMPRISING POLYMERIC FIBERS IN A RESIN OF OLEFIN BLOCK COPOLYMERS

TECHNICAL FIELD

BACKGROUND

The invention pertains polymeric fibers coated with an olefin block copolymer resin and laminates comprising polymeric fibers embedded in a resin of olefin block copolymers. The tapes and the laminates are especially suitable for antiballistic applications as well as composite applications.

U.S. Pat. No. 5,578,370 discloses a mat of mutually intersecting elongate elements. The elongated elements may be produced from a polymeric film coated on both sides with a polymeric material having a lower softening temperature range than the middle, i.e. central layer. The thus obtained composite film is slit to form elongate elements. The mat is then formed with the elongate elements by weaving, knitting or by laying down of a fibrous web. The mat is consolidated by heating the mat to fuse the tapes at least at their intersections. Prior to fusion a stack of two or more mats may be formed to obtain a product comprising at least two woven or knitted mats.

EP 1 403 038 discloses a method for reinforcing an article by attaching to at least one surface of said article a tape, film or yarn. The tape, film or yarn can be formed of any drawn thermoplastic material. A drawn thermoplastic polymer of the AB or ABA type is preferred. The tape, film or yarn of the AB or ABA type is used in a form where the tape, film or yarn are at angle to each other.

It is an object of the present invention to provide an alternative to prior art yarns or laminates suitable for use in antiballistic and composite applications that exhibit lighter weight, improved temperature performance and improved or at least comparable elasticity.

SUMMARY

This object is achieved by polymeric fibers coated with an olefin block copolymer containing resin, the olefin block copolymer having a density of 0.815 kg/dm$^3$ to 0.920 kg/dm$^3$ and a melting point of 110° C. to 130° C. Preferably the olefin block copolymer exhibits a density between 0.825 kg/dm$^3$ and 0.895 kg/dm$^3$.

The olefin block copolymer containing resin exhibits a very high elasticity of several 100%. The elasticity of the olefin block copolymer containing resin measured at room temperature is preferably at least 300%, more preferably at least 600% and it may be up to 1500% or more. The high elasticity is especially advantageous for antiballistic applications as it leads to better absorption of impact energy. Fibers coated with an olefin block copolymer containing resin according to the invention or a laminate made of such fibers are deformed upon impact before breaking.

Preferably the polymeric fibers coated with an olefin block copolymer containing resin are multifilament yarns or monofilament yarns.

Throughout this description, the term "multifilament yarns" refers to linear structures consisting of two or more filaments of in principle endless length. Such multifilaments are known to the skilled person. There is in principle no restriction on the number of individual filaments comprising a multifilament yarn. A multifilament generally comprises between 10 and 500 filaments, and frequently between 50 and 300 filaments.

DETAILED DESCRIPTION OF THE EMBODIMENTS

In another preferred embodiment the polymeric fibers are monofilaments with a cross section having a width/height ratio of at least 2, more preferably at least 5 and most preferably at least 20. The width/height ratio may be up to 100.000. Such filaments are also referred to as tapes. The tape width is dependant from the desired application and it may be less than 1 m, preferably less than 20 cm, more preferably less than 1 cm and most preferably less than 5 mm. A tape with the above mentioned width/height ratio may be a spun monofilament obtained by melt spinning or gel spinning. However, a tape with the above mentioned width/height ratio may not only be a spun monofilament. A tape may also be obtained from a slitted film e.g. a film of the A type, AB type or ABA type, preferably a highly drawn slitted film, an extruded monopolymer, or bicomponent extruded drawn slitted films or co-extruded multilayer "monofilament", a so called solid state extruded film (SSE film) preferably highly drawn known as e.g. Tensylon, Pamako and other equivalents.

The tapes could also be skived from solid polymeric material followed by post drawing.

Important is a tape strength between 50 cN/tex and 500 cN/tex. Examples of suitable tapes are disclosed in WO 2006/107197 and in applicant's unpublished applications No. PCT/EP2007/008495, PCT/EP2007/008500, PCT/EP2007/008499, and PCT/EP2007/008498.

The polymeric fiber in the form of a multifilament or monofilament yarn may be coated with the olefin block copolymer containing resin such that the yarn's surface is completely covered. It is, however, preferred that at least 1% of the yarn's surface is covered, more preferably 3% of the yarn's surface is covered with the coating, even more preferred at least 10% of the yarn's surface is covered with the coating and most preferably at least 20% of the yarn's surface is covered with coating. The weight proportion of the coating lies between 0.01% -50% of the total weight of the coated fiber, preferably between 0.1% and 5%.

Suitable olefin block copolymers are polyolefins with alternating blocks of rigid, i.e. hard and elastomeric segments and a melting point preferably between 115° C. and 125° C. Further, a density of 0.845 kg/dm$^3$ to 0.920 kg/dm$^3$ for the olefin block copolymer is preferred.

Preferably the olefin block copolymer contains an ethylene or propylene homopolymer or a copolymer of ethylene and a $C_{3-8}$ α olefin and an elastomeric ethylene polymer as disclosed in WO2005/090425.

The olefin block copolymer containing resin comprises the specified olefin block copolymers in a concentration of at least 20% by weight, preferably at least 60% by weight and most preferably 100% by weight. The total density of the resin may be higher than the density of the Olefin Block Copolymer itself.

The fibers that are coated with a olefin block copolymer containing resin may be basaltfibres, glassfibres or carbonfibres. It is, however, preferred that the fibers are polymeric fibers, more preferred are polyolefin fibers and especially preferred are polymeric fibers for which the material of the fibers is selected from the group containing high density polyethylene or high density polypropylene having a molecular weight between 10$^5$ g/mol to 10$^6$ g/mol, ultra high molecular weight polyethylene or ultra high molecular weight polypropylene having a molecular weight between $10^6$ g/mol and $10^7$ g/mol or aromatic polyamides e.g. para aramid.

In a most preferred embodiment the polymeric fiber material is high density polyethylene (HDPE) having a molecular weight between $10^5$ g/mol to $10^6$ g/mol. Olefin block copolymers bond very well, yet highly elastic, to HDPE filaments. Olefin block copolymers are thus highly suitable to act as an adhesive in combination with HDPE tapes for the production of laminates that are used as anti-ballistic plates or panels. The weight proportion of the olefin bock copolymers in the laminate lies between 0.01%-50% of the total weight of the laminate, preferably between 0.1% and 5%.

With the term "laminate" a combination of at least two single layers of polymeric fibers is meant, such as e.g. combining two or more crossplied layers. With the term "panel" or "plate" combinations of two or more laminates in a rigid manner is meant, which can be achieved e.g. by applying pressure and temperature to the stack of layers. Under the term "crossply" at least two layers are to be understood, which layers have directions deviating from each other in an angle from 0 to 90°, i.e. the layers are not parallel to each other.

The invention also pertains a process for producing polymeric fibers according to the invention. The coating may be added at all stages during tape manufacturing. The coating may thus be coextruded with the fiber to form a sheath core bicomponent fiber. Preferably the coated fibers are drawn with a drawing rate of at least 1:5. With increased draw ratio the properties of the coated fibers with regard to tenacity, e-modulus and melting point improve. It is therefore preferred that the draw ratio is at least 1:20, at least 1:50 and most preferably at least 1:100.

The polymeric fibers according to the invention may also be produced by coating a film of a polymeric material with the olefin block copolymer on one or both surface sides of the film and subsequently slitting the film into tapes. Two layer tapes are of the so-called AB type or three layer tapes of the ABA type are thus obtained.

Application of the olefin block copolymer containing resin may also take place after drawing or even after winding.

The olefin block copolymer may be dissolved in a suitable solvent. The olefin bock copolymer may also be in the form of a dispersion in a liquid, preferably water, the polymeric film or the already slitted film, i.e. the tapes could therefore be coated "online" during the extrusion and following drawing-process.

The water may be dried-off in the hot air ovens used in the drawing process, leaving a fine, evenly spread thin film of the olefin block copolymer adhesive resin onto the tape.

The olefin block copolymer may also be added in the form of a powder, a fibrous web, hot melt coating, a foil or a film.

Another object of the invention is the provision of laminates comprising polymeric tapes embedded in a resin of olefin block copolymer, the olefin block copolymers having the properties as previously described, characterised in that the laminate comprises at least two monolayers of polymeric tapes.

Olefin block copolymers outperform current adhesive resin materials on the basis of styrene block copolymers, ethylene vinyl acetate or polyolefin resins. The combination of olefin block copolymers with other polymeric materials enhances the properties of the thus obtained composites and may lead to lighter weight, increased elasticity and improved compression set. E.g especially preferred within the framework of this invention is the use of an olefin block copolymer which is available under the name Infuse™.

The use of olefin block copolymers leads to laminates with outstanding properties especially in combination with high density polyethylene or ultra high molecular weight polyethylene in particular for anti-ballistic, high impact applications. These outstanding properties are e.g. a temperature stability of more than 100° C. The use of known styrene block copolymers leads to products with a temperature stability of only about 80° C.

In a preferred embodiment of the laminates according to the invention the polymeric fibers are tapes that are unidirectional arranged in a parallel side by side relationship and the direction of the polymeric tapes being the same in every monolayer and the polymeric tapes of each layer are offset to the tapes of the adjoining layer above or below that layer. The tapes in all monolayers building the laminate have the same direction. The tapes in this preferred embodiment are not angularly offset, i.e. not cross plied. A monolayer of tapes is to be understood as one single layer of tapes arranged in one plane and positioned next to each other e.g. shoulder to shoulder or side by side.

In another preferred embodiment the laminates are characterised in that the laminate comprises polymeric fibers or tapes that are unidirectionally arranged in a parallel side by side relationship and that the fibers or tapes of adjoining layers are crossplied with respect to each other. Under the term "crossply" at least two layers are to be understood, which layers have directions deviating from each other in an angle between 0 to 90°, i.e. the tapes in adjoining layers are not parallel to each other.

In yet another preferred embodiment the laminates are characterised in that the polymeric fibers or tapes of each layer are mutually intersecting fibers or tapes, i.e. the fibers or tapes of each layer are formed into a woven fabric.

A preferred process for producing these laminates is also an object of the present invention. This process comprises the steps of arranging the polymeric fibers or tapes in at least two layers, placing a substrate layer comprising olefin block copolymers having a density of 0.815 kg/dm$^3$ to 0.920 kg/dm$^3$ and a melting point of 110° C. to 130° C. in the form of a film, scrim or nonwoven between each layer and consolidation of the thus arranged layers. Preferably the olefin block copolymer exhibits a density between 0.825 kg/dm$^3$ and 0.895 kg/dm$^3$. Consolidation of the stacked layers is carried out in a manner known to the person skilled in the art by applying pressure and heat to the stacked monolayers, e.g. by thermocalendering. Bonding of the tapes and the respective monolayers is thus achieved by the substrate layer between each monolayer. In loose, separate films between polyolefin tapes/yarns the olefin block copolymer therefore acts like a normal hot-melt-adhesive film.

The laminates according to the invention may also be produced in a process comprising the steps of arranging the polymeric fibers or tapes in at least two layers and consolidation of the thus arranged layers, characterised in that the polymeric fibers or tapes are coated with an olefin block copolymer containing resin, the olefin block copolymers having a density of 0.815 kg/dm3 to 0.920 kg/dm3 and a melting point of 110° C. to 130° C. Bonding of the fibers or tapes and consolidation of the laminate may therefore occur by melting the olefin block copolymer resin already present on the polymeric tapes.

A stack of laminates may be formed into a panel by applying pressure and temperature to the stack of laminates. It should be noted that the laminates comprise at least two monolayers of fibers or tapes and that the laminate as such is not to be considered a monolayer.

The panel comprises at least two stacked laminates that lie on top of another with the laminates being meltbonded preferably over essentially their whole surface area.

The laminates building the panel may be stacked on top of another in such a way that the polymeric tapes building the laminates all lie in the same direction. In a preferred embodiment at least one of the laminates placed on top of another is turned relative to the adjoining laminate placed above or below that laminate, more preferably at least one of the laminates is turned by 90° relative to the adjoining laminate placed above or below that laminate thus obtaining higher tensile strength in transverse direction of the panel. The laminates may also be stacked in an alternating manner of 0° and 90°. The panel may comprise an identical number of laminates with 0° and turned by 90°. It is, however, also sufficient if only the top and bottom laminate are being turned by 90° relative to the other laminates.

In a preferred embodiment of the panel according to the invention the thickness of at least one laminate building the panel does not exceed 500 μm and the strength of at least one laminate is at least 0.8 GPa, 1.2 GPa, 2.5 GPa or 4.5 GPa. Preferably the strength of at least one laminate is comprised between 0.8 GPa and 4.5 GPa, more preferably between 1.4 and 4.5 GPa, and most preferably between 3.0 and 4.5 GPa. In a more preferred embodiment the thickness of at least one laminate does not exceed 100 μm or 130 μm for laminate strengths of at least 0.8 GPa, 3.0 GPa or 4.5 GPa and preferably for laminate strengths comprised between 0.8 GPa and 4.5 GPa, more preferably between 1.4 and 4.5 GPa, and most preferably between 3.0 and 4.5 GPa.

The panel may comprise laminates in which the tapes are unidirectionally arranged in a parallel side by side relationship and the direction of the polymeric tapes is the same in every monolayer and the polymeric tapes of each layer are offset to the tapes of the adjoining layer above or below that layer. The panel may also comprise laminates in which the polymeric tapes of each layer are mutually intersecting tapes. In addition, the panel may comprise laminates in which the polymeric tapes are unidirectionally arranged in a parallel side by side relationship and that the tapes of adjoining layers are crossplied with respect to each other. The panel may also comprise all types of laminates as described above.

In a special embodiment it is in particular preferable if the present panel is provided with one or more layers of an impact resistant material, which impact-resistant material has preferably been selected from one or more of materials from the group consisting of metals, metal alloys, glass, basalt fibre, glass fibre, ceramics or other materials which can be used for antiballistic applications like aramid or ultrahigh molecular weight polyethylene fibres. The layer of impact resistant material may be provided on one or on both surface sides. The impact resistant material may also be sandwiched between individual laminates even in an alternating manner of laminates according to the invention and layers of an impact resistant material.

The invention further pertains the use of the coated fibers as well as the laminates and the stack of laminates according to the invention for anti ballistic applications. Anti ballistic applications may be soft ballistic applications, e.g. bullet proof vests or hard ballistic applications, e.g. high-impact-resistant panels or shields, The invention further pertains the use of the coated polymeric fibers as well as the laminates and the stack of laminates for formed parts, e.g. helmets or formed inserts, e.g. knee pads The use of the laminates and stack of laminates i.e. panels is not limited to antiballistic applications. They can also be used for automotive parts, e.g. doors, fenders or boat hulls and similar applications.

The invention claimed is:

1. Polymeric fibers coated with an olefin block copolymer containing resin, the olefin block copolymer having a density of 0.815 kg/dm$^3$ to 0.920 kg/dm$^3$ and a melting point of 110° C. to 130° C, wherein the polymeric fibers are tapes with a cross section having a width/height ratio of at least 2, and having a tape strength between 50 cN/tex and 500 cN/tex.

2. The polymeric fibers according to claim 1, wherein the fibers are selected from the group consisting of tapes skived from solid polymeric material, tapes obtained from slitted film, tapes from solid state extruded film, and tapes from a gel spun process.

3. The polymeric fibers according to claim 1, wherein the olefin block copolymer has a density of 0.825 kg/dm$^3$ and 0.895 kg/dm$^3$.

4. The polymeric fibers according to claim 1, wherein the olefin block copolymer containing resin comprises the olefin block copolymer in an amount of at least 20% by weight.

5. The polymeric fibers according to claim 1, wherein the cross section of the tapes has a width/height ratio of at least 5.

6. The polymeric fibers according to claim 1, wherein the polymeric material of the fibers is selected from the group consisting of high density polyethylene, ultra high molecular weight polyethylene, and aromatic polyamides.

7. A process for producing the polymeric fibers according to claim 1, wherein a film of a polymeric material is coated with the olefin block copolymer containing resin on one or both surface sides of the film and slit into tapes.

8. An antiballistic application comprising the polymeric fibers according to claim 1.

9. A formed part comprising the polymeric fibers according to claim 1.

10. A composite application comprising the polymeric fibers according to claim 1.

11. Laminates comprising at least two monolayers of polymeric tapes embedded in a resin of olefin block copolymer having a density of 0.815 kg/dm$^3$ to 0.920 kg/dm$^3$ and a melting point of 110° C. to 130° C., wherein the polymeric tapes have a cross section having a width/height ratio of at least 2, and a tape strength between 50 cN/tex and 500 cN/tex.

12. The laminates according to claim 11, wherein the olefin block copolymer has a density of 0.825 kg/dm$^3$ to 0.895 kg/dm$^3$.

13. The laminates according to claim 11, wherein the polymeric tapes are unidirectionally arranged in a parallel side by side relationship, whereby the direction of the polymeric tapes is the same in every monolayer and the polymeric tapes of each layer are offset to tapes of an adjoining layer above or below that layer.

14. The laminates-according to claim 11, wherein the polymeric tapes are unidirectionally arranged in a parallel side by side relationship and tapes of adjoining layers are crossplied with respect to each other.

15. The laminates according to claim 11, wherein the polymeric tapes of each layer are mutually intersecting tapes.

16. A panel comprising a stack of laminates, wherein the panel comprises the laminates according to claim 11.

17. The panel according to claim 16, wherein at least one of the laminates placed on top of another is turned relative to an adjoining laminate placed above or below the at least one laminate.

18. The panel according to claim 16, wherein the panel is provided with one or more layers of an impact resistant material, which impact-resistant material comprises one or more of materials selected from the group consisting of metals, metal alloys, glass, and ceramics.

19. The process for producing laminates according to claim 11, comprising:
   arranging the polymeric tapes in at least two layers;
   placing a substrate layer comprising olefin block copolymers having a density of 0.815 kg/dm$^3$ to 0.920 kg/dm$^3$ and a melting point of 110° C. to 130° C. in the form of a film, scrim or nonwoven between each layer; and
   consolidating the arranged layers.

20. The process for producing laminates according to claim 11, comprising arranging the polymeric tapes in at least two layers and consolidating the arranged layers, wherein the polymeric tapes are coated with an olefin block copolymer containing resin, said olefin block copolymer having a density of 0.815 kg/dm$^3$ to 0.920 kg/dm$^3$ and a melting point of 110° C. to 130° C.

21. The process for producing laminates according to claim 20, wherein the olefin block copolymer has a density of 0.825 kg/dm$^3$ to 0.895 kg/dm$^3$.

22. An antiballistic application comprising the laminates according to claim 11.

23. A formed part comprising the laminates according to claim 11.

24. A composite application comprising the laminates according to claim 11.

* * * * *

UNITED STATES PATENT AND TRADEMARK OFFICE
CERTIFICATE OF CORRECTION

| | | |
|---|---|---|
| PATENT NO. | : 8,679,614 B2 | Page 1 of 1 |
| APPLICATION NO. | : 12/990831 | |
| DATED | : March 25, 2014 | |
| INVENTOR(S) | : Bart Clemens Kranz et al. | |

It is certified that error appears in the above-identified patent and that said Letters Patent is hereby corrected as shown below:

In the claims:

Col. 6, lines 40-41, change "a resin of olefin block copolymer having" to --an olefin block copolymer containing resin, the olefin block copolymer having--.

Col. 7, line 4, change "The process for producing laminates" to --A process for producing the laminates--;

lines 7-8, change "olefin block copolymers" to --the olefin block copolymer--;

line 12, change "The process for producing laminates" to --A process for producing the laminates--;

line 15, change "an" to --the--;

line 19, change "The process for producing laminates" to --The process for producing the laminates--.

Add the following new claim 25:

Col. 7, between lines 27 and 28, add --25. A process for producing the polymeric fibers according to claim 1, wherein the olefin block copolymer containing resin is coextruded with the polymeric fibers to form a sheath core bicomponent fiber.--.

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,679,614 B2 |
| APPLICATION NO. | : 12/990831 |
| DATED | : March 25, 2014 |
| INVENTOR(S) | : Bart Clemens Kranz et al. |

It is certified that error appears in the above-identified patent and that said Letters Patent is hereby corrected as shown below:

On the title page, under abstract "24 Claims, No Drawings" should read --25 Claims, No Drawings--.

In the claims:

Col. 6, lines 40-41, change "a resin of olefin block copolymer having" to --an olefin block copolymer containing resin, the olefin block copolymer having--.

Col. 7, line 4, change "The process for producing laminates" to --A process for producing the laminates--;

lines 7-8, change "olefin block copolymers" to --the olefin block copolymer--;

line 12, change "The process for producing laminates" to --A process for producing the laminates--;

line 15, change "an" to --the--;

line 19, change "The process for producing laminates" to --The process for producing the laminates--.

Add the following new claim 25:

Col. 7, between lines 27 and 28, add --25. A process for producing the polymeric fibers according to claim 1, wherein the olefin block copolymer containing resin is coextruded with the polymeric fibers to form a sheath core bicomponent fiber.--.

This certificate supersedes the Certificate of Correction issued September 30, 2014.

Signed and Sealed this
Twenty-first Day of October, 2014

Michelle K. Lee
*Deputy Director of the United States Patent and Trademark Office*